(12) United States Patent
Lu et al.

(10) Patent No.: US 12,535,193 B2
(45) Date of Patent: Jan. 27, 2026

(54) LAMP APPLICABLE TO MULTIPLE INSTALLATION SCENARIOS

(71) Applicant: Xiamen PVTECH Co., Ltd., Fujian (CN)

(72) Inventors: Fuxing Lu, Fujian (CN); Liangliang Cao, Fujian (CN); Jinsheng Li, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

(21) Appl. No.: 18/902,989

(22) Filed: Oct. 1, 2024

(65) Prior Publication Data
US 2025/0137600 A1    May 1, 2025

(30) Foreign Application Priority Data
Oct. 30, 2023    (CN) .......................... 202322916608.6

(51) Int. Cl.
| | | |
|---|---|---|
| *F21S 4/28* | (2016.01) | |
| *F21V 21/088* | (2006.01) | |
| *F21V 23/00* | (2015.01) | |
| *F21V 23/06* | (2006.01) | |
| *F21V 31/00* | (2006.01) | |

(Continued)

(52) U.S. Cl.
CPC .............. *F21S 4/28* (2016.01); *F21V 21/088* (2013.01); *F21V 23/001* (2013.01); *F21V 23/007* (2013.01); *F21V 23/06* (2013.01); *F21V 31/005* (2013.01); *F21W 2131/305* (2013.01); *F21Y 2107/50* (2016.08)

(58) Field of Classification Search
CPC ........ F21S 4/28; F21V 21/088; F21V 23/001; F21V 23/007; F21V 23/06; F21V 31/005; F21W 2131/305; F21Y 2107/50
See application file for complete search history.

(56) References Cited

U.S. PATENT DOCUMENTS

| | | | | |
|---|---|---|---|---|
| 4,007,371 A | * | 2/1977 | Njos ........................ | H05B 3/80 |
| | | | | 392/448 |
| 5,310,963 A | * | 5/1994 | Kennelly ............... | H02G 3/088 |
| | | | | 174/650 |

(Continued)

*Primary Examiner* — Evan P Dzierzynski
(74) *Attorney, Agent, or Firm* — Bruce Stone LLP; Joseph A. Bruce

(57) ABSTRACT

A lamp applicable to multiple installation scenarios includes a light-emitting module, a sealing system, a driving module and an installation component. The light-emitting module includes a light cover, a section bar disposed inside the light cover, and a light source disposed on the section bar. The sealing system includes a first end cap and a second end cap disposed at two ends of the light-emitting module respectively. The driving module is combined with the second end cap, and includes a driver disposed within the light-emitting module and the sealing system, and a power cord connected to the driver. The installation component includes a buckle clamping the region between the light-emitting module and the sealing system, and a fixing element for fixing the buckle. This lamp can achieve many advantages, such as convenient installation, adjustable light-emitting angle, uniform illumination, and convenient and efficient wiring.

9 Claims, 11 Drawing Sheets

(51) Int. Cl.
    *F21W 131/305*    (2006.01)
    *F21Y 107/50*    (2016.01)

(56) References Cited

U.S. PATENT DOCUMENTS

| | | | | |
|---|---|---|---|---|
| 5,716,123 | A * | 2/1998 | Lamming | F21V 9/08 362/310 |
| 5,848,836 | A * | 12/1998 | Graber | F21L 2/00 362/267 |
| 7,559,672 | B1 * | 7/2009 | Parkyn | A47F 3/04 362/127 |
| 10,473,279 | B2 * | 11/2019 | Chien | F21V 3/02 |
| 11,085,592 | B1 * | 8/2021 | Wang | F21V 23/045 |
| 2003/0189827 | A1 * | 10/2003 | Cheng | H04N 1/0287 362/396 |
| 2010/0103672 | A1 * | 4/2010 | Thomas | F21S 4/28 362/235 |
| 2014/0355254 | A1 * | 12/2014 | Grajcar | A01K 61/00 362/101 |
| 2016/0313052 | A1 * | 10/2016 | Eicher | G02B 6/001 |
| 2019/0101248 | A1 * | 4/2019 | Hu | F21K 9/275 |
| 2020/0200332 | A1 * | 6/2020 | Powell | F21K 9/278 |
| 2020/0355336 | A1 * | 11/2020 | Ostrander | H05B 45/10 |
| 2021/0116078 | A1 * | 4/2021 | Xiong | F21V 3/062 |

\* cited by examiner

LAMP APPLICABLE TO MULTIPLE INSTALLATION SCENARIOS

BACKGROUND OF THE INVENTION

1. Field of the Invention

The present invention relates to a lamp, in particular to a lamp applicable to multiple installation scenarios.

2. Description of the Prior Art

With the continuous development of refrigerator technology, refrigerators have been applied to a lot of households as well as major supermarkets and malls, becoming essential household appliances for storing goods (food, drink, etc.) on a daily basis. Due to the frequent need for use, refrigerators require interior lighting for the convenience of users in retrieving items. Currently available LED refrigerator lamps are typically fixed using bolts, nuts and screws with washer. However, the above fixing method results in slow installation and removal. Additionally, the light-emitting angle of a LED refrigerator lamps cannot be adjusted, leading to uneven illumination in the refrigerator compartment. Thus, the user may not clearly see the goods disposed at some corners of the refrigerator compartment.

SUMMARY OF THE INVENTION

One embodiment of the present invention provides a lamp applicable to multiple installation scenarios, which includes a light-emitting module, a sealing system, a driving module and an installation component. The light-emitting module includes a light cover, a section bar disposed inside the light cover, and a light source disposed on the section bar. The sealing system includes a first end cap and a second end cap disposed at two ends of the light-emitting module respectively. The driving module is combined with the second end cap, and includes a driver disposed within the light-emitting module and the sealing system, and a power cord connected to the driver. The installation component includes a buckle clamping the region between the light-emitting module and the sealing system, and a fixing element for fixing the buckle.

In one embodiment, the shape of the cross section of the light cover is circular or square.

In one embodiment, the shape of the cross section of the section bar is I-shaped, H-shaped, V-shaped, or U-shaped.

In one embodiment, the section bar has a first support plate and a second support plate connected to each other, and there is a first included angle between the first support plate and the second support plate. The light source is disposed on one side of the section bar, and the light source has a first light source board disposed on the first support plate and a second light source board disposed on the second support plate. There is a second included angle between the first light source board and the second light source board, and the first included angle is equal to the second included angle.

In one embodiment, the driver is disposed on another side of the section bar.

In one embodiment, the light source is adhered or clipped to the section bar.

In one embodiment, a sealing circular pad is provided between the first end cap, the second end cap and the light-emitting module.

In one embodiment, the second end cap includes an end cap plug, a nut, and an inner core, and the nut and the inner core press the power cord to make the power cord be in the sealed state.

In one embodiment, the power cord includes a male end, a female end, and a sealing ring, and the sealing ring is disposed on the male end.

Another embodiment of the present invention provides refrigerator lamp, which includes a top wall, two side walls, an upright wall, a ceiling, a bottom box and a lamp. One end of each of the side wall is connected to two sides of the top wall. The upright wall is disposed between the two side walls. The ceiling is disposed on the top wall. The bottom box is connected to the other end of each of the two side walls opposite to the top wall. The lamp is installed on the upright wall, the top wall, or one of the side walls.

To sum up, the lamp according to the embodiments of the present invention can achieve many advantages, such as convenient installation, adjustable light-emitting angle, uniform illumination, and convenient and efficient wiring.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
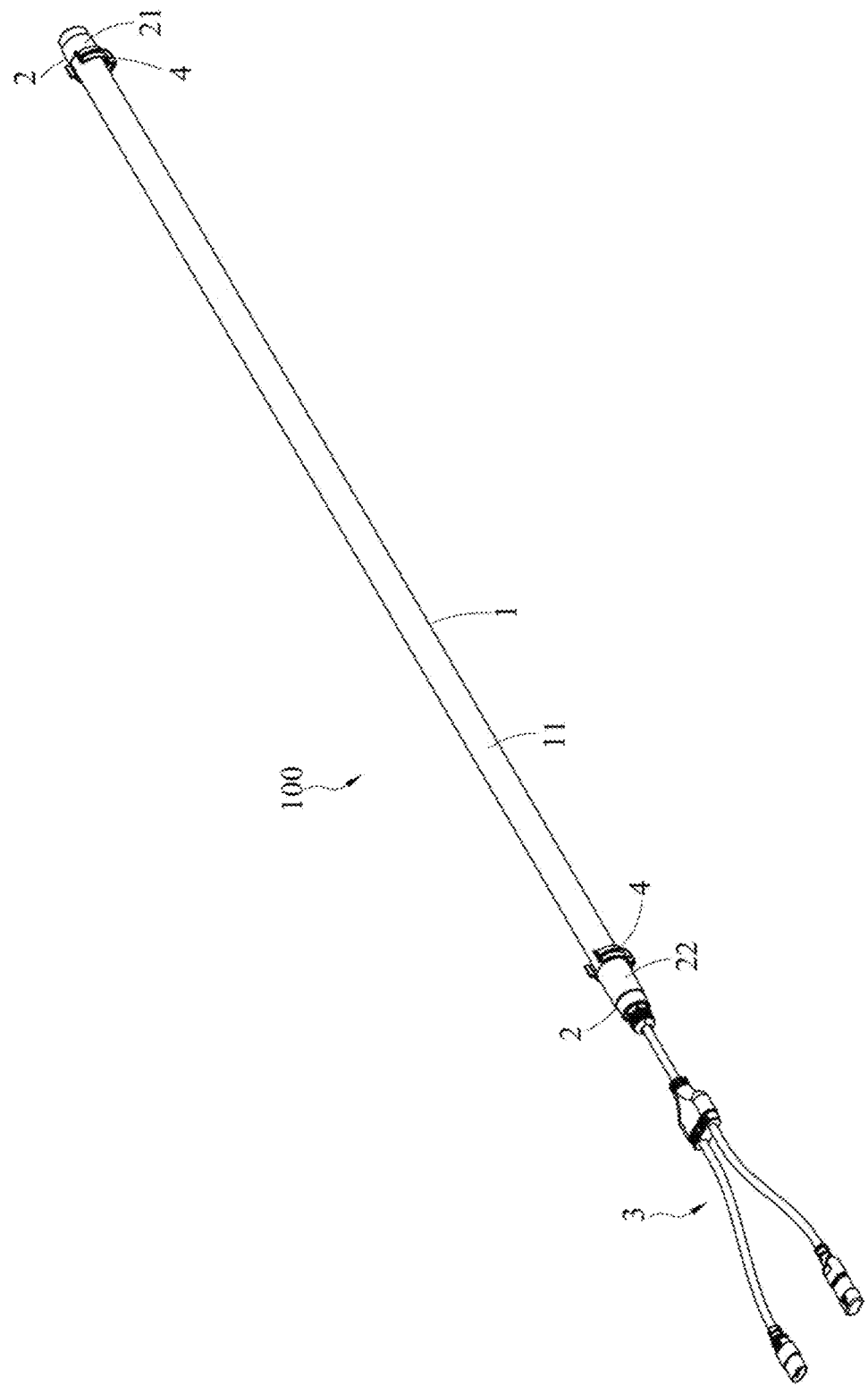
FIG. 1 is a perspective view of a lamp in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
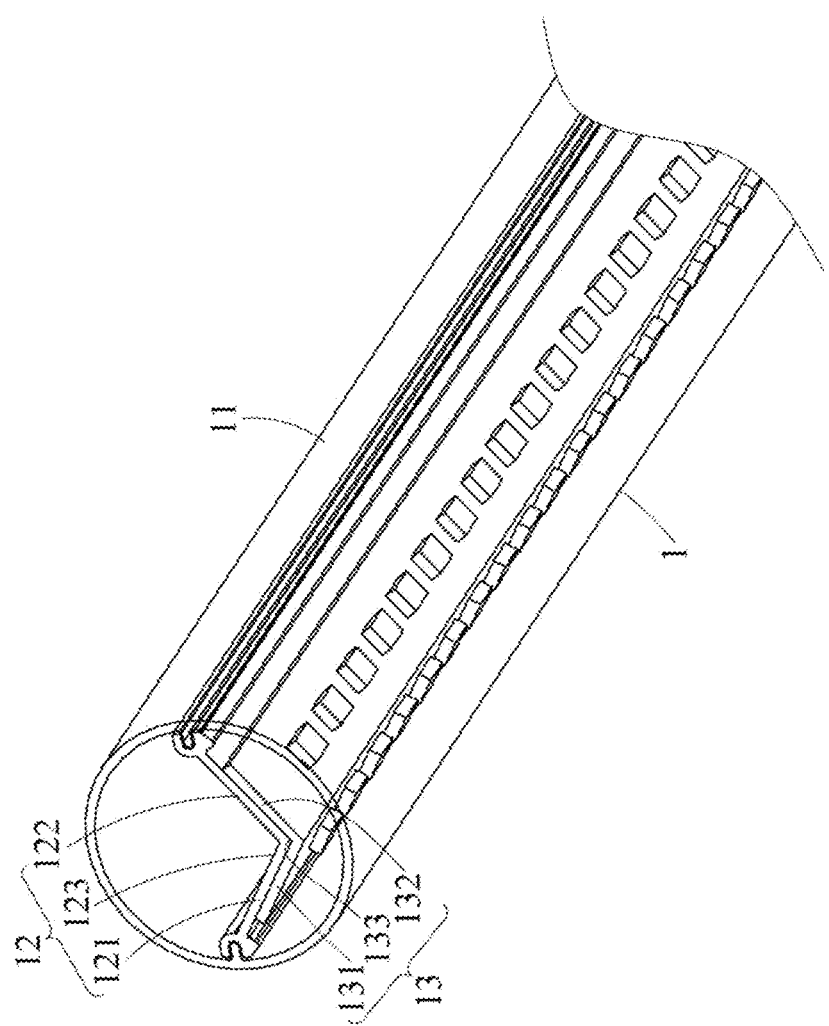
FIG. 2 is a schematic view illustrating a light cover, a section bard and a light source of the lamp in accordance with one embodiment of the present invention.
Figure 3:
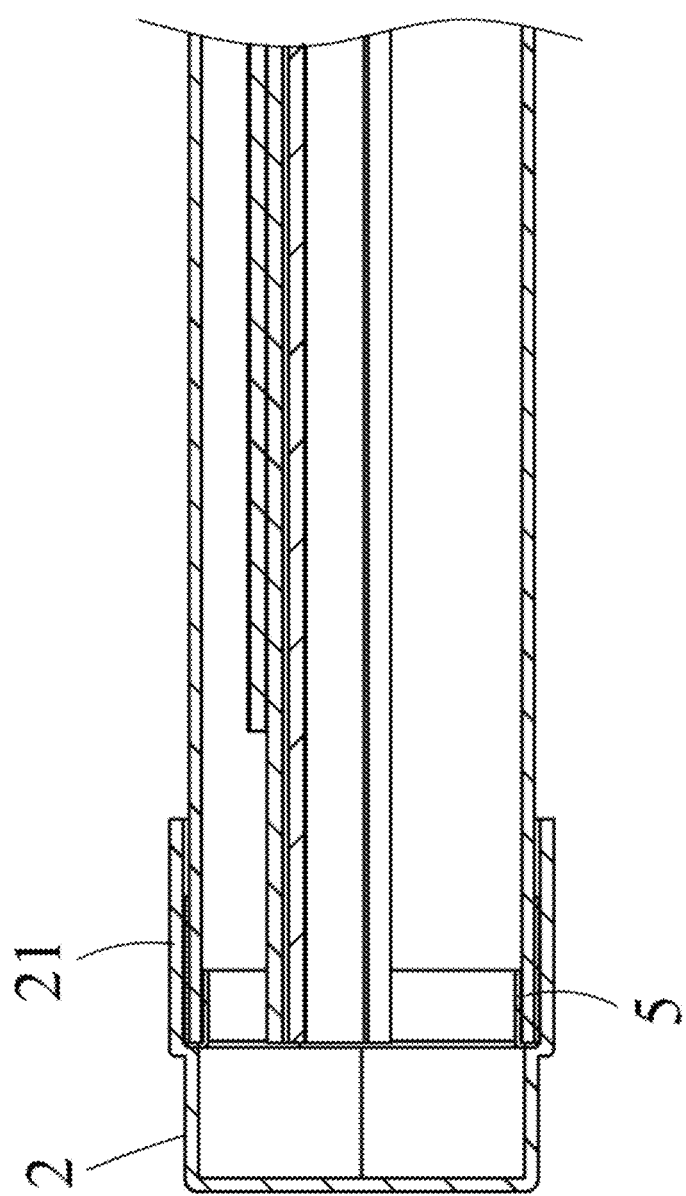
FIG. 3 is a schematic view illustrating a first end cap of the lamp in accordance with one embodiment of the present invention.
Figure 4:
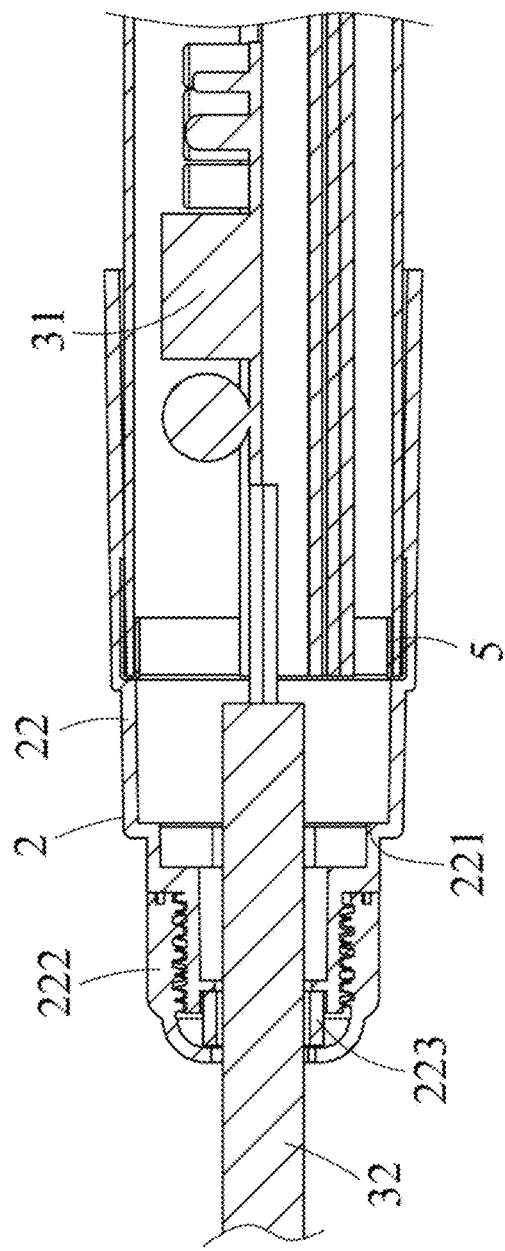
FIG. 4 is a schematic view illustrating a second end cap of the lamp in accordance with one embodiment of the present invention.

Please refer to FIG. 1, FIG. 2, FIG. 3 and FIG. 4. FIG. 1 is a perspective view of a lamp in accordance with one embodiment of the present invention. FIG. 2 is a schematic view illustrating a light cover, a section bard and a light source of the lamp in accordance with one embodiment of the present invention. FIG. 3 is a schematic view illustrating a first end cap of the lamp in accordance with one embodiment of the present invention. FIG. 4 is a schematic view illustrating a second end cap of the lamp in accordance with one embodiment of the present invention. The lamp 100 applicable to multiple installation scenarios includes a light-emitting module 1, a sealing system 2, a driving module 3 and an installation component 4.

As shown in FIG. 2, in some embodiments, the light-emitting module 1 includes a transparent light cover 11, a section bar 12, and a light source 13.

As shown in FIG. 2, in some embodiments, the shape of the cross section of the light cover 11 is geometrically shaped such as circular or square, for example, diamond-shaped.

As shown in FIG. 2, in some embodiments, the section bar 12 is disposed inside the light cover 11, and the light source 13 is disposed on the section bar 12. In some embodiments, the light source 13 is adhered or clipped to the section bar 12, with at least one in quantity.

In some embodiments, the material of the section bar 12 is primarily heat-dissipating material, such as metal material or other heat-dissipating polymer materials. In some embodiments, the shape of the cross section of the section bar 12 can be geometrically shaped such as I-shaped, mouth-shaped, V-shaped, or U-shaped, for example, wave-shaped.

As shown in FIG. 2, in some embodiments, the section bar 12 has a first support plate 121 and a second support plate 122 connected to each other, with a first included angle 123 between the first support plate 121 and the second support plate 122. The light source 13 is on one side of the section bar 12. The light source 13 includes a first light source board 131 on the first support plate 121 and a second light source board 132 on the second support plate 122, with a second included angle 133 between the first light source board 131 and the second light source board 132. The first included angle 123 is equal to the second included angle 133. The driver 31 is disposed on the other side of the section bar 12.

As shown in FIG. 3 and FIG. 4, in some embodiments, a sealing circular pad 5 is provided between the first end cap 21, the second end cap 22 and the light-emitting module 1 for sealing purposes. Besides, the waterproof level can also be increased by applying waterproof glue.

As shown in FIG. 4, in some embodiments, the second end cap 22 includes an end cap plug 221, a nut 222, and an inner core 223. The power cord 32 is sealed by the nut 222 and the inner core 223 through compression, achieving the sealing effect (the nut 222 and the inner core 223 can press the power cord 32 to make the power cord 32 be in the sealed state).

As shown in FIG. 1, FIG. 3 and FIG. 4, in some embodiments, the sealing system 2 includes the first end cap 21 and second end cap 22 disposed at both ends of the light-emitting module 1.

Figure 5:
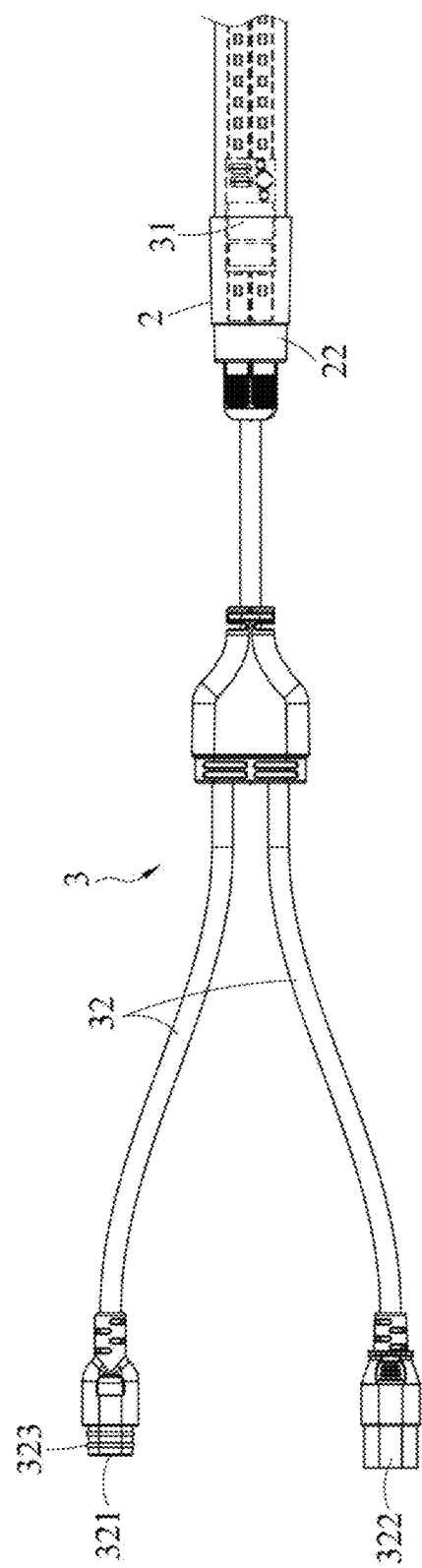
FIG. 5 is a schematic view illustrating a driving module of the lamp in accordance with one embodiment of the present invention.

As shown in FIG. 4 and FIG. 5, FIG. 5 is the top view of the driving module 3. In some embodiments, the driving module 3 is combined with the second end cap 22, and waterproofing is achieved through the second end cap 22. The driving module 3 includes the driver 31 and the power cord 32. The driver 31 is disposed within the light-emitting module 1 and the sealing system 2, and the power cord 32 is connected to the driver 31.

As shown in FIG. 5, in some embodiments, the power cord 32 includes a male end 321, a female end 322, and a sealing ring 323. The sealing ring 323 is disposed on the male end 321.

Figure 6:
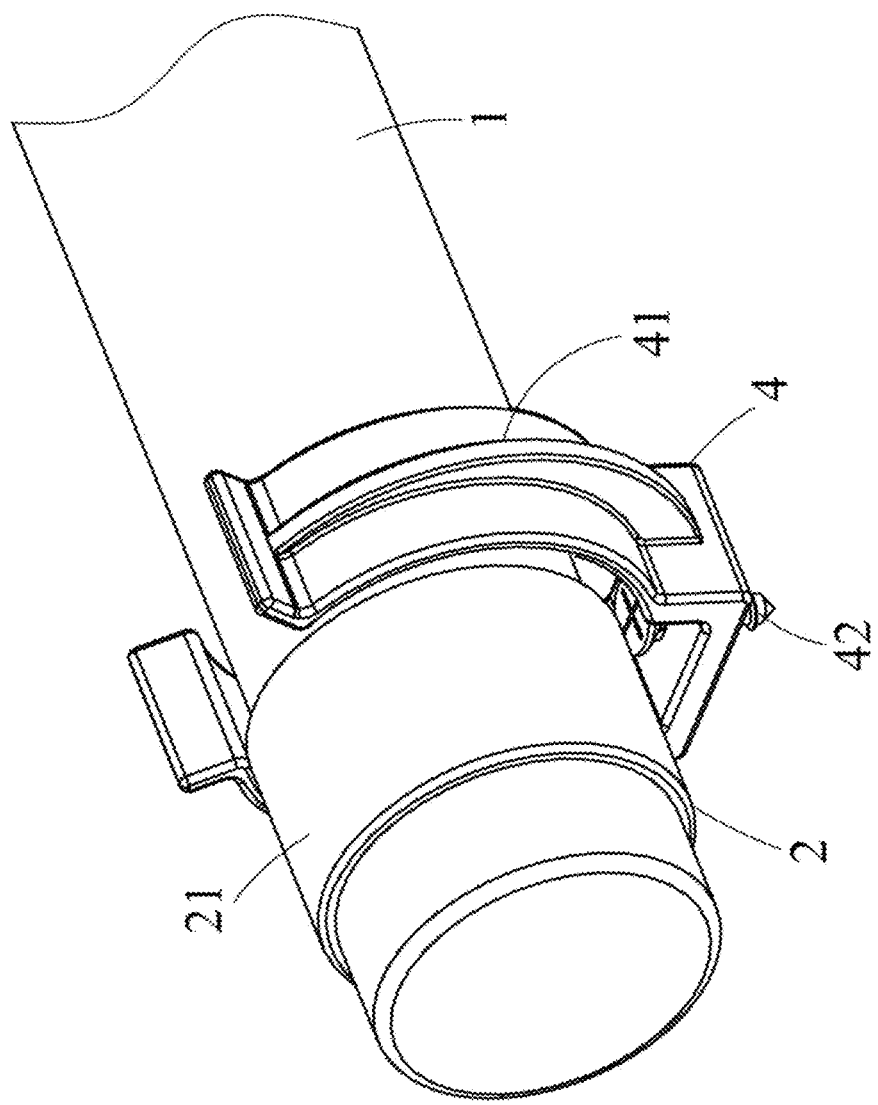
FIG. 6 is a schematic view illustrating an installation component of the lamp in accordance with one embodiment of the present invention.
Figure 7:
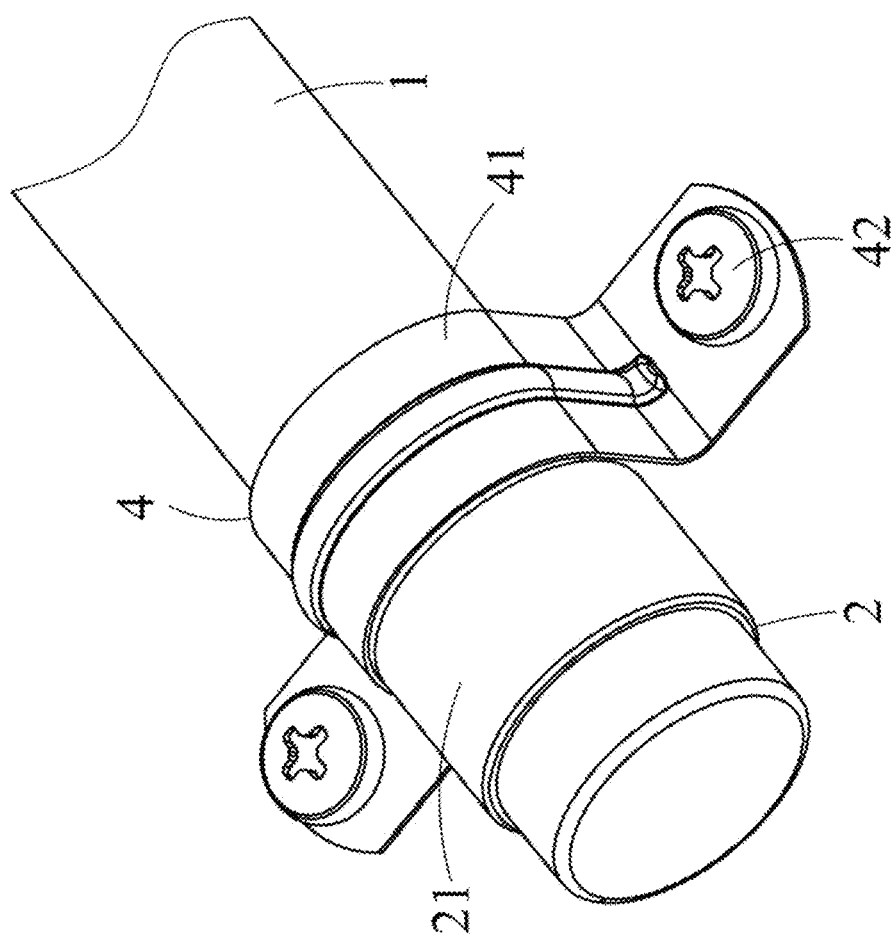
FIG. 7 is a schematic view illustrating an installation component of the lamp in accordance with another embodiment of the present invention.

Please refer to FIG. 6 and FIG. 7. FIG. 6 is a schematic view illustrating an installation component 4 of the lamp in accordance with one embodiment of the present invention. FIG. 7 is a schematic view illustrating an installation component 4 of the lamp in accordance with another embodiment of the present invention. In some embodiments, the installation components 4 includes a buckle 41 (such as a clamp) clamping the region between the light-emitting module 1 and the sealing system 2, and a fixing element 42 (such as a screw) for fixing the buckle 41. The buckle 41 is made of plastic material, while the clamp is made of metal material. The material can be selected according to requirements and the size of the installation position. For instance, if the above components are made of plastic material, these components may be used for smaller installation positions, but the service live of which is short. If the above components are made of metal material, these components may be used for larger installation positions and the service live of which is long.

Figure 8:
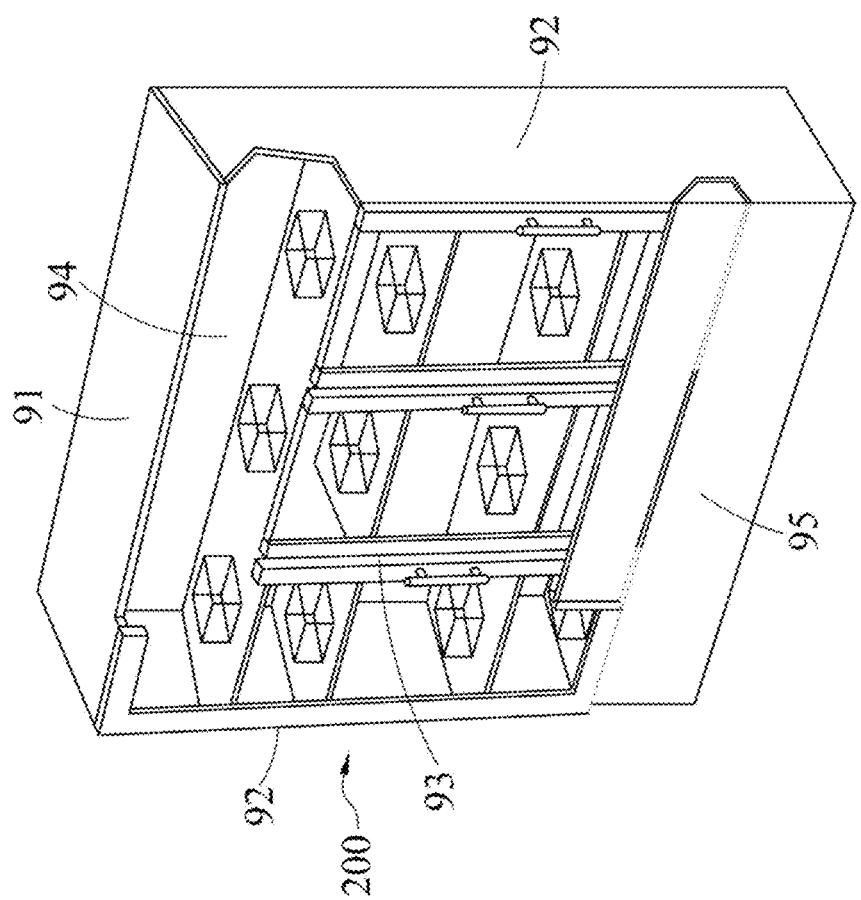
FIG. 8 is a perspective view of a refrigerator lamp in accordance with one embodiment of the present invention.

Please refer to FIG. 8, which is a perspective view of a refrigerator lamp 200 in accordance with one embodiment of the present invention. In some embodiments, to provide more usage scenarios, the refrigerator lamp 200 includes a top wall 91, two side walls 92, an upright wall 93, a ceiling 94, a bottom box 95, and the aforementioned lamp 100. One end of one of the side walls 92 is connected to the one side of the top wall 91 and one end of the other of the side walls 92 is connected to the other side of the top wall 91. The upright wall 93 is disposed between the two side walls 92, and the ceiling 94 is disposed on the top wall 91. The bottom box 95 is opposite to the top wall 91. One side of the bottom box 95 is connected to the other end of one of the side walls 92 and the other side of the bottom box 95 is connected to the other end of the other of the side walls 92.

Figure 9:
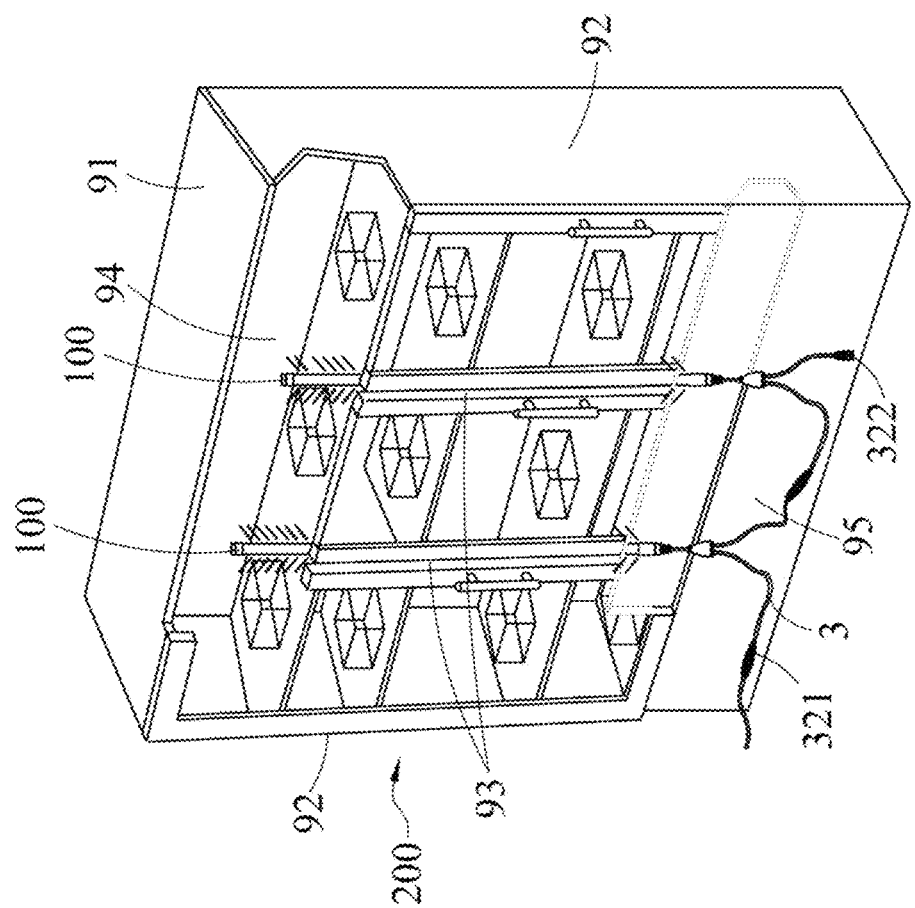
FIG. 9 is a schematic view illustrating a first installation scenario of the refrigerator lamp in accordance with one embodiment of the present invention.

Please refer to FIG. 1, FIG. 8, and FIG. 9. FIG. 9 is a schematic view illustrating a first installation scenario of the refrigerator lamp 200 in accordance with one embodiment of the present invention. The embodiment shows the first installation scenario of the refrigerator lamp 200. The lamp 100 is installed on the upright wall 93. Due to the shape of the section bar 12 matching with the light source 13, it is possible to achieve illumination on two or three sides according to actual usage conditions, eliminating dark corners in the refrigerator. Even after installation, the light-emitting module 1 can be rotated via the installation components 4 to adjust the light-emitting angle, facilitating the user to adjust the light-emitting angle according to actual needs. The driving module 3 is disposed in the bottom box 95, and multiple LED refrigerator lamps 200 are connected in parallel through the power cord 32. The sealing of the male end 321 and the female end 322 of the power cord 32 is achieved using the sealing ring 323 for waterproofing. In this way, the user can conveniently install the refrigerator lamp 200 and connect the refrigerator lamp 200 to an external power source (e.g., utility power). The user can also conveniently uninstall the refrigerator lamp 200.

Figure 10:
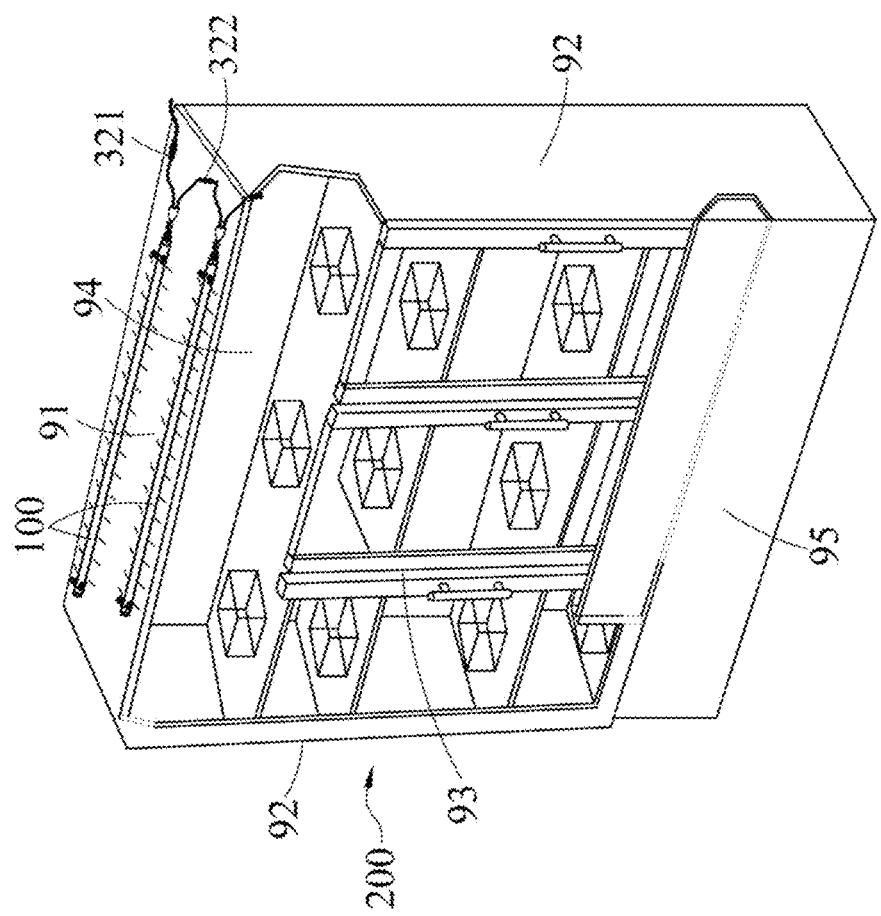
FIG. 10 is a schematic view illustrating a second installation scenario of the refrigerator lamp in accordance with one embodiment of the present invention.

Please refer to FIG. 1, FIG. 8, and FIG. 10. FIG. 10 is a schematic view illustrating a second installation scenario of the refrigerator lamp 200 in accordance with one embodiment of the present invention. The embodiment shows the second installation scenario of the refrigerator lamp 200. The lamp 100 is installed on the top wall 91. Due to the shape of the section bar 12 matching with the light source 13, it is possible to achieve illumination on two or three sides according to actual usage conditions, eliminating dark corners inside the refrigerator. Even after installation, the light-emitting module 1 can be rotated via the installation components 4 to adjust the light-emitting angle. The driving module 3 is disposed in the ceiling 94, and multiple LED refrigerator lights 200 are connected in parallel through the power cord 32. The sealing of the male end 321 and the female end 322 of the power cord 32 is achieved using the sealing ring 323 for waterproofing. In this way, the user can conveniently install the refrigerator lamp 200 and connect the refrigerator lamp 200 to an external power source. The user can also conveniently uninstall the refrigerator lamp 200.

Figure 11:
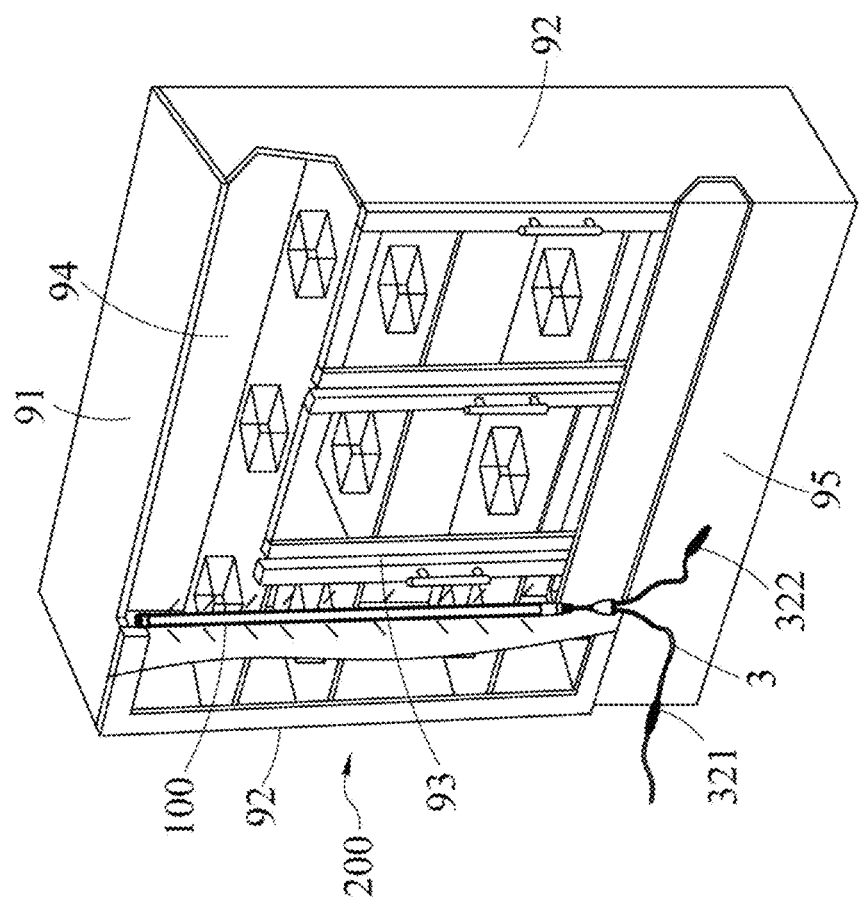
FIG. 11 is a schematic view illustrating a third installation scenario of the refrigerator lamp in accordance with one embodiment of the present invention.

Please refer to FIG. 1, FIG. 8, and FIG. 11. FIG. 11 is a schematic view illustrating a third installation scenario of the refrigerator lamp in accordance with one embodiment of the present invention. The embodiment shows the third installation scenario of the refrigerator lamp 200. The lamp 100 is installed on the side wall 92. Due to the shape of the section bar 12 matching with the light source 13, it is possible to achieve illumination on two or three sides according to actual usage conditions, eliminating dark corners inside the refrigerator. Even after installation, the light-emitting module 1 can be rotated via the installation components 4 to adjust the light-emitting angle, facilitating the user to adjust the light source illumination angle according to actual needs. The driving module 3 is disposed in the bottom box 95, and multiple LED refrigerator lights 200 are connected in parallel through the power cord 32. The sealing of the male end 321 and the female end 322 of the power cord 32 is achieved using the sealing ring 323 for waterproofing. In this way, the user can conveniently install the refrigerator lamp 200 and connect the refrigerator lamp 200 to an external power source. The user can also conveniently uninstall the refrigerator lamp 200.

As shown in FIG. 9~FIG. 11, the lamp 100 is suitable for installation on the upright wall 93, the top wall 91, or the side wall 92. The refrigerator has multiple refrigerator compartments, each storing food and goods. The above installation scenarios can be used in combination according to actual conditions, as follows: if the refrigerator is small, it is suggested to adopt the first installation scenario; if the refrigerator is medium-sized, it is suggested to simultaneously adopt the first installation scenario and the third installation scenario; if the refrigerator is large, it is suggested to simultaneously adopt the first installation scenario, the second installation scenario and the third installation scenario.

To sum up, the lamp 100 according to the embodiments of the present invention can achieve many advantages, such as convenient installation, adjustable light-emitting angle, uniform illumination, and convenient and efficient wiring.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lamp applicable to multiple installation scenarios comprising:
    a light-emitting module comprising a light cover, a section bar disposed inside the light cover, and a light source disposed on the section bar;
    a sealing system comprising a first end cap and a second end cap disposed at two ends of the light-emitting module respectively, wherein the second end cap comprises an end cap plug, a nut, and an inner core, and the second end cap is mounted on the end cap plug, wherein a front portion of the second end cap is provided with external threads, and the nut comprises internal threads and an opening, and the internal threads are disposed on an inner surface of the nut, and the inner core is disposed inside the nut and adjacent to the opening;
    a driving module combined with the second end cap, and comprising a driver disposed within the light-emitting module and the sealing system, and a power cord, wherein the power cord passes through the opening to connect to the driver; and
    an installation component comprising a buckle clamping a region between the light-emitting module and the sealing system, and a fixing element configured to fix the buckle;
    wherein the nut is engaged with the external threads on the front portion of the second end cap via the internal threads thereof, whereby the nut is screwed onto the front portion of the second end cap and the front portion of the second end cap is encircled by the nut, wherein the inner core and the inner surface of the nut are positioned on opposite sides of the front portion of the second end cap respectively, whereby the nut forces the inner core via the front portion of the second end cap to press the power cord to make the power cord be in a sealed state after the nut is screwed onto the front portion of the second end cap.

2. The lamp applicable to multiple installation scenarios as claimed in claim 1, wherein a shape of a cross section of the light cover is circular or square.

3. The lamp applicable to multiple installation scenarios as claimed in claim 1, wherein a shape of a cross section of the section bar is I-shaped, H-shaped, V-shaped, or U-shaped.

4. The lamp applicable to multiple installation scenarios as claimed in claim 1, wherein the section bar has a first support plate and a second support plate connected to each other, and there is a first included angle between the first support plate and the second support plate, wherein the light source is disposed on one side of the section bar, and the light source has a first light source board disposed on the first support plate and a second light source board disposed on the second support plate, wherein there is a second included angle between the first light source board and the second light source board, and the first included angle is equal to the second included angle.

5. The lamp applicable to multiple installation scenarios as claimed in claim 4, wherein the driver is disposed on another side of the section bar.

6. The lamp applicable to multiple installation scenarios as claimed in claim 1, wherein the light source is adhered or clipped to the section bar.

7. The lamp applicable to multiple installation scenarios as claimed in claim 1, wherein a sealing circular pad is provided between the first end cap, the second end cap and the light-emitting module.

8. The lamp applicable to multiple installation scenarios as claimed in claim 1, wherein the power cord comprises a male end, a female end, and a sealing ring, and the sealing ring is disposed on the male end.

9. A refrigerator lamp comprising:
a top wall;
two side walls, wherein one end of each of the side wall is connected to two sides of the top wall;
an upright wall disposed between the two side walls;
a ceiling disposed on the top wall;
a bottom box connected to another end of each of the two side walls opposite to the top wall; and
a lamp as claimed in claim 1 installed on the upright wall, the top wall, or one of the side walls.

* * * * *